United States Patent
Ammon et al.

(10) Patent No.: US 8,930,061 B2
(45) Date of Patent: Jan. 6, 2015

(54) METHOD AND APPARATUS FOR INFLUENCING THE TRANSVERSE DYNAMICS OF A VEHICLE

(75) Inventors: Dieter Ammon, Remseck (DE); Jens Kalkkuhl, Holzgerlingen (DE); Daniel Keppler, Althengstett (DE); Magnus Rau, Kirchheim unter Teck (DE); Avshalom Suissa, Althengstett (DE)

(73) Assignee: Daimler AG, Stuttgart (DE)

( * ) Notice: Subject to any disclaimer, the term of this patent is extended or adjusted under 35 U.S.C. 154(b) by 979 days.

(21) Appl. No.: 12/666,522

(22) PCT Filed: Jun. 4, 2008

(86) PCT No.: PCT/EP2008/004458
§ 371 (c)(1), (2), (4) Date: Jun. 4, 2010

(87) PCT Pub. No.: WO2009/000388
PCT Pub. Date: Dec. 31, 2008

(65) Prior Publication Data
US 2010/0262328 A1    Oct. 14, 2010

(30) Foreign Application Priority Data
Jun. 27, 2007   (DE) .................. 10 2007 029 605

(51) Int. Cl.
*G06F 17/00* (2006.01)
*B62D 6/04* (2006.01)
*B60T 8/1755* (2006.01)
*B60T 8/00* (2006.01)

(52) U.S. Cl.
USPC ............................................. 701/29; 701/41

(58) Field of Classification Search
USPC .......................................................... 701/29
See application file for complete search history.

(56) References Cited

U.S. PATENT DOCUMENTS 4,750,125 A * 6/1988 Leppek et al. .................. 701/83
5,379,218 A   1/1995 Jacobi et al.
(Continued)

FOREIGN PATENT DOCUMENTS

DE   40 14 365 A1   11/1990
DE   44 19 650 A1   7/1995
(Continued)

OTHER PUBLICATIONS

Form PCT/ISA/220 (one (1) page).
(Continued)

*Primary Examiner* — Hiep V Nguyen
(74) *Attorney, Agent, or Firm* — Crowell & Moring LLP

(57) ABSTRACT

In a method and apparatus for influencing transverse dynamics of a vehicle, for a chassis intervention is carried out when an intervention condition is met. The intervention condition is met when the value of a determined transverse dynamics disturbance variable is higher than a disturbance variable threshold value, and when one or a group of the following criteria is met:
the longitudinal speed of the vehicle is higher than a longitudinal speed threshold value of the vehicle;
the sensorially detected actual yaw rate is lower than or equal to a calculated current yaw rate;
a braking torque variable describing a braking torque and caused by braking by the driver is lower than or equal to a braking torque threshold value;
a spring variable describing the current spring path of a chassis spring of a vehicle wheel is lower than or equal to a spring path threshold value;
a differential spring variable describing the difference between the current spring paths of the two chassis springs of a vehicle axle is lower than or equal to a differential spring path threshold value; and
a slip difference variable describing the slip difference between two vehicle wheels is lower than or equal to a slip differential threshold value.

14 Claims, 3 Drawing Sheets

(56) References Cited

U.S. PATENT DOCUMENTS

| | | |
|---|---|---|
| 6,449,542 B1 | 9/2002 | Bottiger et al. |
| 6,600,974 B1 | 7/2003 | Traechtler |
| 6,863,356 B2 | 3/2005 | Hackl et al. |
| 7,222,507 B2 * | 5/2007 | Wetzel et al. ............... 70/48 |
| 2004/0162656 A1 * | 8/2004 | Huber et al. ............... 701/41 |
| 2007/0021896 A1 * | 1/2007 | O'Dea ............... 701/70 |

FOREIGN PATENT DOCUMENTS

| | | |
|---|---|---|
| DE | 100 31 266 A1 | 1/2001 |
| DE | 100 53 604 A1 | 5/2002 |
| DE | 102 36 331 A1 | 2/2004 |
| DE | 10 2004 017 638 A1 | 10/2005 |
| DE | 10 2004 047 860 A1 | 4/2006 |
| EP | 0 529 258 A1 | 3/1993 |
| EP | 1 000 838 A2 | 5/2000 |
| JP | 3-125614 A | 5/1991 |
| JP | 2002-211380 A | 7/2002 |
| WO | WO 99/26811 | 6/1999 |
| WO | WO 99/58381 A1 | 11/1999 |
| WO | WO 2006/037678 A1 | 4/2006 |

OTHER PUBLICATIONS

Form PCT/ISA/237 (six (6) pages).
International Search Report dated Dec. 29, 2008 w/partial English translation (six (6) pages).
Japanese Office Action dated Nov. 9, 2011 (Three (3) pages).
Van Zanten, Anton T. et al., "950759 VDC, The Vehicle Dynamics Control System of Bosch," Robert Bosch GmbH, pp. 9-26.
Von Anton van Zanten, et al., "FDR-Die Fahrdynamik-regelung von Bosch," ATZ Automobiltechische Zeitschrift 96 (1994); pp. 674-689.
Opposition document in European Patent Application No. 08759014.7 dated Nov. 22, 2011.
Japanese-language Office Action dated Mar. 26, 2013 w/ partial English translation (four (4) pages).
German-language Summons to Oral Proceeding under Rule 115 dated Apr. 11, 2014 (7 pages).

* cited by examiner

METHOD AND APPARATUS FOR INFLUENCING THE TRANSVERSE DYNAMICS OF A VEHICLE

BACKGROUND AND SUMMARY OF THE INVENTION

This application is a national stage of PCT International Application No. PCT/EP20081004458, filed Jun. 4, 2008, which claims priority under 35 U.S.C §119 to German Patent Application No. 10 2007 029 605.5, filed Jun. 27, 2007, the entire disclosure of which is herein expressly incorporated by reference.

The invention relates to a device for influencing the transverse dynamics of a vehicle, especially a motor vehicle, wherein a transverse dynamics disturbance variable acting on the vehicle (and especially the chassis) is determined by means of a disturbance variable determination device, and a chassis intervention braking intervention is brought about.

The present invention further relates to a transverse dynamics influencing device for a vehicle, especially a motor vehicle, with a disturbance variable determination device for determining a transverse dynamics disturbance variable acting on the vehicle and especially the chassis.

To increase driving safety when driving a vehicle, such as a motor vehicle, it is desirable to assist the driver with regard to suddenly occurring influences or disturbances of the vehicle transverse dynamics. Such disturbances of the vehicle transverse dynamics can especially occur with a strong lateral wind in connection with lateral wind blasts.

In a device for influencing the transverse dynamics of a motor vehicle in the form of a parallel drive regulation system disclosed in German patent document DE 40 14 365 A1, the distance to a guide device is measured during a parallel drive, and with distance changes (for example, due to a lateral wind), the driving direction is corrected by braking. However, the described device can only be used when the mentioned guide device is present.

In a method and a apparatus for influencing the transverse dynamics of a vehicle disclosed in International Patent. Document WO 2006/037678 A1, a determined disturbance of the transverse dynamics is dealt with by a change of the wheel load of at least one vehicle wheel.

One object of the invention, starting from a method and a device of the above-mentioned type, is to provide a method and apparatus that increases driving safety in different driving situations.

This and other objects and advantages are achieved by the driving assistance method and apparatus according to the invention, in which, the driver needs not react with a (possibly uncontrolled) steering movement response to a sudden disturbance of the vehicle transverse dynamics; rather, an automatic compensation or correction of the disturbance is provided, so that, the driving safety is increased. This advantageous result is achieved according to the invention without depending on external devices, such as the above-mentioned guide device. Also, a chassis intervention as defined below) is triggered only if the intervention condition is fulfilled. In this manner, driving situations are excluded in which a chassis intervention (especially a braking intervention) would not increase driving safety. Moreover, chassis interventions which could reduce the driving safety are not carried out.

The intervention condition is fulfilled, if one of the given criteria or a group of several of the given criteria is fulfilled:
the amount of the determined transverse disturbance variable is larger than a disturbance variable threshold value, whereby braking interventions with low transverse dynamics disturbances are avoided:
the longitudinal speed of the vehicle is higher than a longitudinal speed threshold value, whereby braking interventions in an uncritical situation with a lower longitudinal vehicle speed can be avoided:
the sensorially detected actual yaw rate is lower than or equal to a current yaw rate calculated by means of for example the actual transverse acceleration, to avoid unnecessary braking interventions in situations where the occurring yaw rate or transverse acceleration was not mainly caused by the transverse dynamics disturbance variable;
a braking torque variable describing a braking torque and caused by braking by the driver is lower than or equal to a braking torque threshold value, so that with braking processes with large braking torques (such as, for example, emergency or full braking processes), automatic one-sided braking interventions can be avoided;
a spring path variable describing the current spring path of a chassis spring of a vehicle wheel is lower than or equal to a spring path threshold value;
a differential spring path variable describing the difference between the current spring paths of the two chassis springs of a vehicle axle is lower than or equal to a differential spring path threshold value; and/or
a slip difference variable describing the slip difference between two vehicle wheels is lower than or equal to a slip differential threshold value.

The intervention condition is advantageously fulfilled only if the amount of the steering wheel angle is lower than or equal to a steering angle threshold value and/or if the amount of the steering angle speed is lower than or equal to a steering angle speed threshold value. In this manner, a chassis intervention with dynamic steering wheel rotations by the driver can be avoided, so as not to endanger the driving safety.

Furthermore, the intervention condition can be fulfilled only if the amount of the stationary transverse acceleration is lower than or equal to a transverse acceleration threshold value, Chassis interventions during the driving of dynamic maneuvers (for example, when driving through turns with correspondingly small turning radii) are avoided in this manner. A longitudinal speed-dependent steering wheel limit is thus achieved.

It is also possible to recognize a lateral wind acting on the chassis of the vehicle and to compensate at least partially a corresponding disturbance of the transverse dynamics by the chassis intervention to increase the driving safety in the case of an occurring lateral wind.

The chassis intervention can be any one or more of the following:
a braking intervention at one or several wheels;
an influence of the wheel loads at one or several wheels;
an influence of the servo torque of a servo motor of a servo steering system; and
a change of one or several wheel drive torques at one or several wheels.

Furthermore, an "interference determination value" can be determined, which describes the amount of the transverse dynamics disturbance variable or the amount of the yaw torque, determined by means of the transverse dynamics disturbance variable, to be adjusted in order to compensate for the transverse disturbance, with a variable correlating the two variables. Thereby, with magnitudes of the intervention determination value below a lower threshold value, only one of the wheels (especially one of the non-steerable wheels) can be braked via an associated braking device. With amounts of the intervention determination value larger than or equal to the lower threshold value, and lower than an upper threshold value, only one of the steerable wheels can be braked at the front axle, via the associated braking device. Furthermore, with amounts of the intervention determination value larger than or equal to the upper threshold value, both wheels of the same vehicle side can be braked via the respective associated braking devices. In this manner, brake intervention can be adapted to the intensity of the transverse dynamics disturbance caused by the transverse dynamics disturbance variable.

Further, there is also the possibility of braking both wheels of the same vehicle side via the respective associated braking devices, with the braking force distribution between the steerable wheel and the corresponding non-steerable wheel being parameter-dependent. In particular, it can be given in a vehicle-dependent manner and/or adjusted in a driving situation-dependent manner.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic depiction of a motor vehicle with an embodiment of the device according to the invention. The motor vehicle 1 has four wheels 2.1-2.4, each being an associated braking unit 3.1-3.4 operatively connected to it. Each of the braking units 3.1-3.4 is formed for braking of the wheel 2.1-2.4 respectively associated therewith, and can be activated individually, independent of the respective other braking units. Thereby, different braking forces or braking actions can be achieved at the single wheels 2.1-2.4. (A corresponding activation of the braking unit with 2.1-2.4 is also called "braking intervention".)

Figure 1:
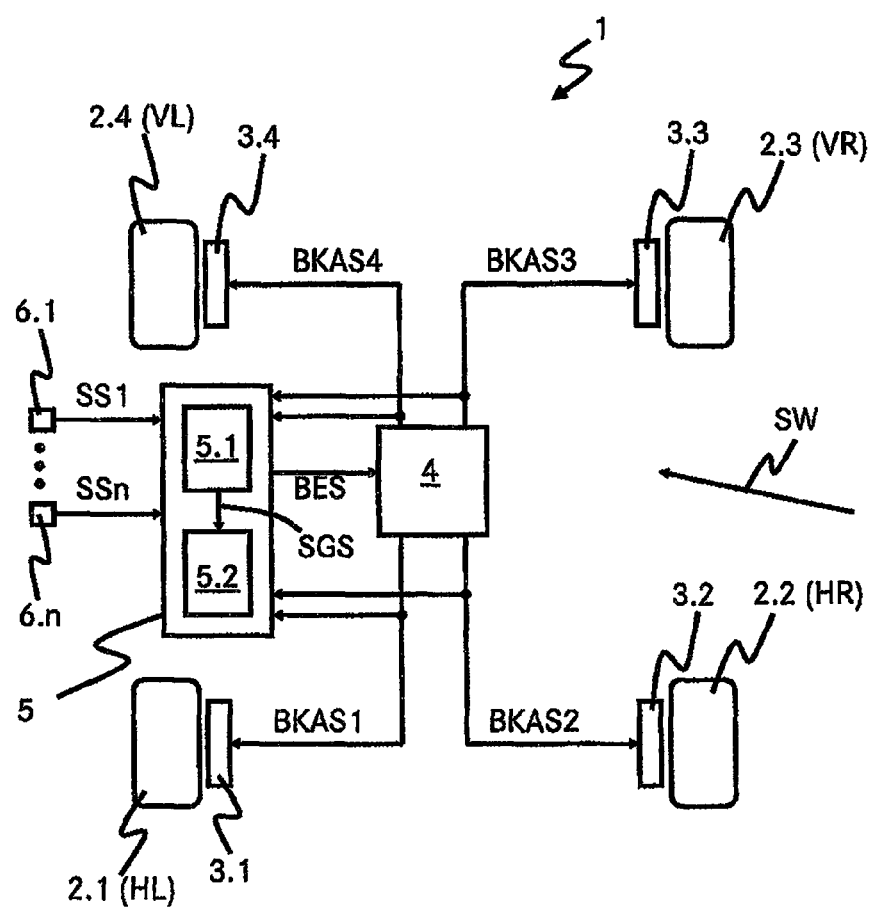
FIG. 1 is a schematic depiction of a motor vehicle with a design of the device according to the invention.

For activating the braking units 3.1-3.4, a braking force activation unit 4 is provided according to the invention, which is coupled in signal communication with the braking units 3.1-3.4 The braking force activation unit 4 itself is coupled in signal communication with a control unit 5, which has a disturbance variable determination device 5.1 (also referred to herein as a "disturbance variable viewer"), and a checking device 5.2. The control unit 5 is connected to a number of sensors 6.1-6.n.

The sensors 6.1-6.n serve to determine drive-dynamic actual variables of the vehicle 1, such as an actual yaw rate, a longitudinal vehicle speed, a steering wheel angle, a steering angle or an actual transverse acceleration. Corresponding sensor signals in SS1-SSn are transferred by the sensors 6.1-6.n to the control unit 5 and thus to the disturbance variable determination device 5.1 and the checking device.

The disturbance variable determination device 5.1 determines a transverse dynamics disturbance variable of the vehicle from the actual variables of the vehicle 1, as is explained in detail in the German patent application 10 2004 017 638. In this manner, the disturbance variable determination device 5.1 can be used especially for determining the disturbance effect of lateral wind SW acting on the vehicle 1 or its chassis and the influence of the vehicle transverse dynamics caused thereby. The German patent application 10 2004 017 638 is insofar referred to explicitly.

The disturbance variable determination device 5.1 generates a disturbance variable signal SGS, which is transmitted to the checking device 5.2. The checking device 5.2, determines by means of a given intervention condition, if a braking intervention shall be brought about that counteracts the transverse dynamics disturbance. A corresponding intervention signal BES is transferred to the braking force activation device 4, which activates at least one of the braking units 3.1-3.4 by means of corresponding braking force activation signals BKAS1-BKAS4, in dependence on the intervention signal BES. The braking force activation signals are also transmitted to the control unit 5 and especially the disturbance variable determination device 5.1, to be able to consider the braking torque caused at one vehicle side and the influence of the yaw movement of the vehicle resulting therefrom, during the determination of the transverse dynamic disturbance variable.

The braking intervention is basically carried out at a wheel 2.1, 2.4 or 2.2, 2.3 of a vehicle side to generate a yaw torque counter-directed to the transverse disturbance. So as to make the braking intervention as comfortable as possible for the driver, only the corresponding non-steerable wheel 2.1 or 2.2 can be braked exclusively, or at least in a first braking intervention stage at the rear axle of the vehicle, such that possible noticeable feedbacks at the steering wheel of the vehicle 1 remain as low as possible. How strong possible feedbacks on the steering wheel are during the wheel-individual braking of a steerable wheel 2.3 or 2.4 depends on the vehicle type and its chassis design. Whether the braking intervention takes place at a steerable wheel 2.3 or 2.4 and/or at a non-steerable wheel 2.1 or 2.2, is adapted individually to the vehicle type. With vehicle types where, during braking of a steerable wheel 2.3 or 2.4, only small feedbacks occur at the steering wheel, the steerable wheel 2.3 or 2.4 of the same vehicle side can be braked alternatively or in addition to the non-steerable rear wheel 2.1 or 2.2, to compensate for transverse disturbances.

It is thus possible to design the braking intervention in such a manner that the wheels 2.1, 2.4 or 2.2, 2.3 of one vehicle side are braked simultaneously. The braking force distribution between the steerable front wheel 2.3 or 2.4 and the rear wheel 2.2 or 2.1 on this vehicle side can be preset dependent upon the vehicle and/or adjusted in dependence on the driving situation. The braking force distribution between the steerable front wheel 2.3 or 2.4 and the non-steerable rear wheel 2.2 or 2.1 can for example be considered by parameters such as the amount of the transverse dynamics disturbance variable, the steering angle, the brake torque caused on the vehicle side and the influence of the yaw movement of the vehicle resulting therefrom during the determination of the transverse dynamic disturbance variable.

An intervention determination value, which describes the amount of the transverse dynamics disturbance variable or the amount of the yaw torque to be adjusted, can be determined in the checking device 5.2 using the transverse dynamics disturbance variable for compensating the transverse disturbance, or the amount of another variable correlating with one of the two variables. A multi-stage braking intervention can then take place as a function of the intervention determination value, wherein the following possibilities result:

a) The intervention determination value exceeds the intervention threshold value and is smaller than a preset lower threshold value: First, only one wheel 2.1 or 2.2 or 2.3 or 2.4 is braked (preferably, a non-steerable wheel 2.3 or 2.4). Only if this braking intervention carried out exclusively at one of the wheels 2.1 or 2.2 or 2.3 or 2.4 does not show a sufficient effect, the further wheel 2.1 or 2.2 or 2.3 or 2.4 of the same vehicle side is braked.

b) If the intervention determination value is higher than or equal to the lower threshold value, both wheels 2.1, 2.4 or 2.2, 2.3 of the same vehicle side are braked to reduce the transverse dynamics influence of the vehicle 1 by the transverse dynamics and to ensure a high driving safety.

c) In a further development, it is also possible to provide three intervention stages:

With an intervention determination value higher than the intervention threshold value and lower than the lower threshold value, only one of the non-steerable wheels 2.1 or 2.2 is braked via the respective associated braking devices 3.1 or 3.2.

With an intervention determination value higher than or equal to the lower threshold value and smaller than an upper threshold value, only one of the steerable wheels 2.3 or 2.4 is braked at the front axle via the respective associated braking device 3.3 or 3.4.

With an intervention determination value higher than or equal to the upper threshold value, both wheels 2.1, 2.4 or 2.2, 2.3 of the same vehicle side are braked by the respective associated braking devices 3.1, 3.4 or 3.2, 3.3.

If a lateral wind blast SW (FIG. 1) acts, for example, on the chassis of the vehicle 1 seen from the right in the drive direction, the right rear wheel 2.2 and/or the right front wheel 2.3 can be braked, so as to generate a yaw torque on the vehicle 1 around its vertical axis in the clockwise direction. With a lateral wind acting on the vehicle 1 from the left, the directions are exactly reversed, wherein the left front wheel 2.4 and or the left rear wheel 2.1 are then braked.

The disturbance of the transverse dynamics by the lateral wind SW is at least compensated partially by the braking intervention. The disturbance determination device 5 and/or the braking force activation device 4 is/are formed for this purpose to determine a necessary braking force at a wheel or several wheels 2.1-2.4 of the vehicle 1, so as to compensate the occurred disturbance of the vehicle transverse dynamics correspondingly as already mentioned.

The driver of the vehicle 1 is thus assisted during the compensation of a disturbance of the vehicle transverse dynamics, such as for example a lateral wind blast. The disturbance of the transverse dynamics is thus reduced automatically or completely compensated, helping to increase driving safety.

Figure 2:
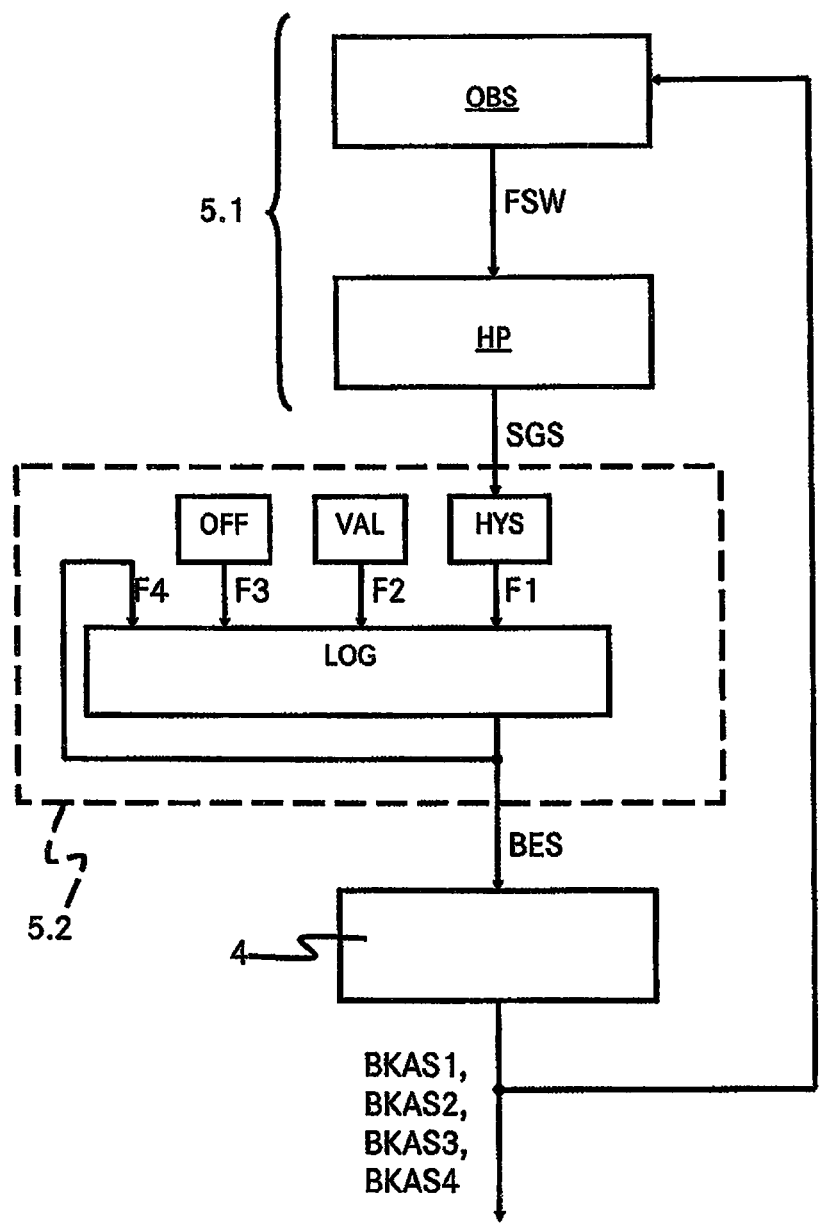
FIG. 2 is a block diagram that depicts a progress of an embodiment of the method according to the invention.

In the following, an embodiment of the method according to the invention is explained with references to FIG. 2. FIG. 2 is a block diagram of an embodiment of the method according to the invention for influencing the transverse dynamics of a vehicle, especially the motor vehicle 1 according to FIG. 1.

The method according to the invention starts with the determination of the transverse dynamics disturbance variable FSW in a viewer block OBS, based on the of the drive-dynamic actual values of the vehicle measured by means of the sensors 6.1 to 6.n, and on the braking force activation signals BKAS1-BKAS4. The method for determining the transverse dynamics disturbance variable used in the viewer block OBS is described in German patent application DE 10 2004 017 638 A1, which is referred to in this connection.

The transverse dynamics disturbance variable FSW, determined in this manner by means of the viewer block OBS, is subsequently high pass filtered in a high pass filter HP to filter out stationary parts of the transverse dynamics disturbance variable, which are not considered in the following method. (Only dynamic parts of the transverse dynamics disturbance variable FSW are considered in the further method.) The highpass filter HP generates the high pass filtered transverse dynamics disturbance variable, which corresponds to the disturbance variable signal SGS in the present case, and is transferred to the checking device 5.2 of the control unit.

In the checking device 5.2 it is checked if a preset intervention condition is fulfilled. The intervention condition has several criteria with the embodiment of the method, which for example respectively have to be fulfilled individually to fulfill the intervention condition. These criteria serve to exclude drive situations, in which no automatic braking intervention is to be caused.

It is checked in a hysteresis block as a first criterion, whether the disturbance variable signal SGS (that is, the high pass filtered transverse dynamics disturbance variable) is larger than a preset activation threshold value, or is smaller than a deactivation threshold value. The activation threshold value is larger than the deactivation threshold value, so that a hysteresis is formed. If the disturbance variable signal is larger than the activation threshold value, a first flag F1=1 is set. If, however, the disturbance variable signal SGS is smaller than the deactivation threshold value, the first flag K1=0 is set:

SGS>activation threshold value $\Rightarrow$ F1=1 or
SGS<deactivation threshold value $\Rightarrow$ F1=0.

Figure 3:
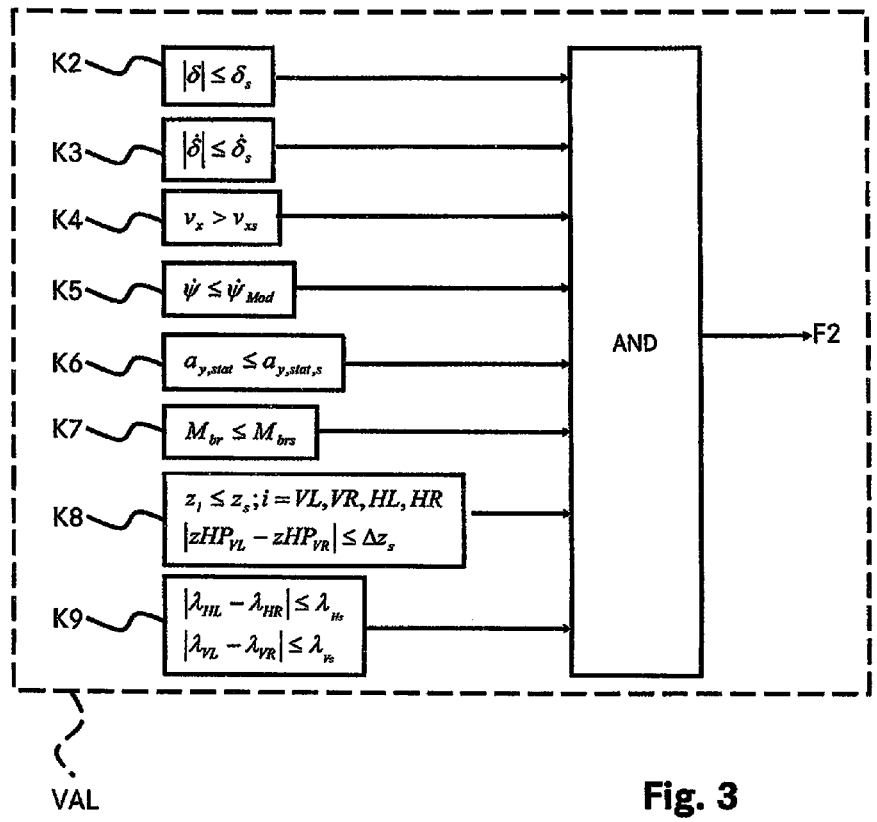
FIG. 3 is a block diagram that illustrates checking of several criteria of an intervention condition in the validity block VAL of FIG. 2.

Further criteria are checked in a validity block VAL, for example eight criteria K2 to K9, via which the current drive situation is judged, as is depicted in detail in FIG. 3 schematically. The following criteria are checked to determine whether:

second Criterion K2:
the amount of the steering wheel angle $\delta$ is smaller than or equal to the steering wheel threshold value $\delta_s$;

third Criterion K3:
the amount of the steering wheel angle speed $\dot{\delta}$ is smaller than or equal to a steering wheel speed threshold value $\dot{\delta}_s$;

fourth Criterion K4:
the longitudinal vehicle speed $v_x$ is higher than a longitudinal vehicle speed threshold value $v_{xs}$;

fifth Criterion K5:
the sensorially detected actual yaw rate $\dot{\Psi}$ is lower than or equal to a calculated current yaw rate $\dot{\Psi}_{mod}$ (calculated on the basis of a given vehicle model), which describes the connection between the transverse acceleration and yaw rate, by means of the measures actual transverse acceleration $a_y$;

sixth Criterion K6:
the amount of the stationary transverse acceleration $a_{y,stat}$ is smaller than or equal to a transverse acceleration threshold value $a_{y,stat,s}$;

seventh Criterion K7:
braking torque $M_{br}$ caused by the driver by braking, which depicts a braking torque variable with the embodiment is lower or equal to a braking torque threshold value $M_{brs}$;

eighth Criterion K8:
the current spring paths $z_{VL}, z_{VR}, z_{HL}, z_{HR}$ at the chassis springs of the vehicle wheels 2.1 (HL), 2.2 (HR), 2.3 (VR), 2.4 (VL), which for example depicts a spring path variable, are lower or equal to a spring path threshold value $z_s$; it is checked additionally if the amount of a difference spring path variable, which is for example formed by the difference $|zHP_{VL}-zHP_{VR}|$ of the current spring paths $zHP_{VL}, zHP_{VR}$ especially high pass-filtered via a high pass is formed at the two chassis springs of a vehicle axle, is smaller or equal to a difference spring path threshold value $\Delta z_s$;

ninth Criterion K9:

a slip differential value, which is here formed by the slip difference between two vehicle wheels is lower or equal to a slip difference threshold value; a first slip difference $|\lambda_{VL} - \lambda_{VR}|$ is for example compared between the two front wheels 2.3 (VR), 2.4 (VL) and a second slip difference $|\lambda_{HL} - \lambda_{HR}|$ between the two rear wheels 2.1 (HL), 2.2 (HR) with a front axle slip difference threshold value $\lambda v_s$ or a rear axle slip difference threshold value $\lambda v_s$:

$$|\lambda_{HL} - \lambda_{HR}| \leq \lambda_{Hs}$$

$$|\lambda_{VL} - \lambda_{VR}| \leq \lambda_{Vs}$$

It is determined via the logic block AND, if all of the eight criteria K2 to K9 are fulfilled (that is, whether all inequalities given in FIG. 3 are fulfilled and thus "true"). If so, the second flag is set F2=1. On the other hand, if one or more the criteria K2 to K9 checked in the validity block are not fulfilled, the second flag F2=0.

Figure 4:
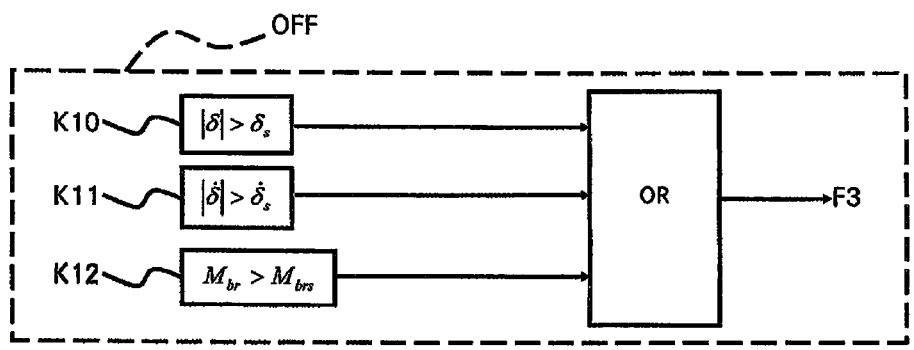
FIG. 4 is a block diagram that illustrates checking of further criteria of an intervention condition in switch-off bock OFF of FIG. 2.

In a switch-off block OFF (FIG. 2, and shown in more detail in FIG. 4), one or more switch-off criteria K10, K11, K12 are considered. A third flag F3 is set to F3=1, if at least one of the switch-off criteria is fulfilled. The switch-off criteria checked with the embodiment described here are:

first Switch-Off Criterion K10:
the amount of the steering wheel angle $\delta$ is larger than the steering wheel threshold value $\delta_s$;

second Switch-Off Criterion K11:
the amount of the steering angle speed $\dot{\delta}$ is higher than the steering angle speed threshold value $\dot{\delta}_s$;

third Switch-Off Criterion K12:
the braking torque $M_{br}$ caused by the driver by braking is higher than the brake torque threshold value $M_{brs}$.

If none of the switch-off criteria K10, K11, K12 is fulfilled, the third flag F3 is set to F3=0. The switch-off criteria K10, K11, K12 are interconnected to the third flag F3 in the or interconnection block OR.

Considering the three flags F1, F2, F3 and a fourth flag F4, the intervention signal BES is determined in a logic block LOG, which is fed back to an input of the logic block LOG as the fourth flag F4. In the logic block, the values of the flags F1, F2, F3, F4, present in the current method cycle, and also partially the values of the flags F1, F2, F3, F4 from the previous method cycle n−1 are used for determining the intervention signal BES. In the present case, the values of the first flag F1, the second flag F2, and the fourth flag F4 from the previous method are considered.

The following is valid as necessary conditions for an intervention signal BES triggering a braking process:

The third flag F3=0 (that is, none of the switch-off criteria K10, K11, K12 is fulfilled); and the first flag F1=1, that is, the conditions defined in the hysteresis block HYS have to be fulfilled.

In the current method cycle n, the intervention signal BES is BES(n)=F4(n)=1. if one of the combinations occurring in the following table occurs. Each row of the table corresponds to a combination of conditions which triggers or maintains a braking operation in the prevailing method cycle:

| F2(n − 1) | F2(n) | F1(n − 1) | F1(n) | F3(n) | F4(n − 1) |
|---|---|---|---|---|---|
| 0 | 0 | 1 | 1 | 0 | 1 |
| 0 | 1 | 0 | 1 | 0 | 0 |
| 0 | 1 | 0 | 1 | 0 | 1 |

-continued

| F2(n − 1) | F2(n) | F1(n − 1) | F1(n) | F3(n) | F4(n − 1) |
|---|---|---|---|---|---|
| 0 | 1 | 1 | 1 | 0 | 1 |
| 1 | 0 | 1 | 1 | 0 | 1 |
| 1 | 1 | 0 | 1 | 0 | 0 |
| 1 | 1 | 0 | 1 | 0 | 1 |
| 1 | 1 | 1 | 1 | 0 | 1 |

A braking process at one or more wheels is triggered or maintained via the braking force activation device 4, if the intervention signal is BES=1.

A new method cycle starts subsequently analogous to the above-described method cycle. At the start of the first method cycle, respective starting values F1(start), F2(start), F3(start) and F4(start) are given as values of the flags F1, F2, F3, F4 for the previous method cycle, so that the method can also work with the first method cycle (e.g., when starting the vehicle). Such an approach is known with cyclic methods. The start values can for example be given as follows: F1(Start)=0, F2(Start)=0, F3(Start)=0 and F4(Start)=0.

The embodiment described here carries out a braking intervention as chassis intervention to counteract the transverse dynamics disturbance.

Alternatively or in addition, the transverse dynamics disturbance can also be compensated, at least partially, by other chassis interventions:

The servo torque of a servomotor (especially, an electrical servo motor) for the vehicle steering system can be influenced, so that the driver is supported when countersteering. The servo-torque is directed in such a manner that the driver is prompted to steer against the transverse dynamics disturbance. If the driver does not hold the steering wheel, and if he complies with the servo torque of the servo motor, a so-to-speak automatic countersteering takes place.

The wheel load of one or more wheels 2.1-2.4 of the vehicle 1 can be changed, for example by the actuation of an active spring or damper system associated with the respective wheel 2.1, 2.2, 2.3, 2.4, or an active stabilisator of the vehicle. The wheel load of two wheels opposite each other 2.1 (HL) and 2.3 (VR) or 2.2 (HR) and 2.4 (VL)b can be increased with regard to the two other wheels 2.2 (HR) and 2.4 (VL) or 2.1 (HL) and 2.3 (VR). A transverse force is generated by the axle geometry, especially the toe-in. Alternatively or in additional, the wheel loads can also be reduced at two wheels diagonally opposite. This transverse force can be used to compensate at least partially for the transverse dynamics disturbance.

Analogous to carrying out a braking process, there is also the possibility to distribute the wheel drive force unequally on the two vehicle sides, which can for example be achieved by an actuatable axle differential. The wheel drive force can thus be increased at one vehicle side and/or be reduced at the other. A yaw movement is effected due to the to the unequal wheel drive forces on both vehicle sides. This yaw movement takes place against the transverse dynamics disturbance and can thus at least reduce this and compensate it completely in the ideal case.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for influencing the transverse dynamics of a vehicle, said method comprising:
   detecting, by a disturbance variable determination device, a transverse dynamics disturbance variable acting on the vehicle;
   checking, by a checking device, whether a preset intervention condition is fulfilled; and
   if an intervention condition is fulfilled, carrying out a chassis intervention to influence the transverse vehicle dynamics;
   wherein the intervention condition is fulfilled when the magnitude of the determined transverse dynamics disturbance variable is higher than a disturbance variable threshold value, and when at least two of the following criteria are fulfilled
      longitudinal speed of the vehicle is higher than a longitudinal speed threshold value of the vehicle;
      a sensor detected actual yaw rate is lower than a calculated current yaw rate; and
      a slip difference variable describing the slip difference between two vehicle wheels is lower than or equal to a slip differential threshold value.

2. The method according to claim 1, wherein detecting said transverse dynamics disturbance comprises detecting said transverse dynamics disturbance on a chassis of the vehicle.

3. The method according to claim 2, wherein:
   a lateral wind acting on the chassis of the vehicle by means of the disturbance variable determination device is recognized; and
   a corresponding disturbance of the transverse dynamics of the vehicle is compensated at least partially.

4. The method according to claim 1, wherein the intervention condition is fulfilled if at least one of the following is true:
   the amount of the steering wheel angle is lower than or equal to a steering angle threshold value; and
   the amount of the steering wheel angle speed is lower than or equal to a steering angle speed threshold value.

5. The method according to claim 1, wherein the intervention condition is fulfilled when stationary transverse acceleration of the vehicle is smaller than or equal to a transverse acceleration threshold value.

6. The method according to claim 1, wherein an intervention determination value is determined, which describes at least one of:
   the amount of the transverse dynamic disturbance variable;
   the amount of the yaw rate to be adjusted by means of the transverse dynamics disturbance variable for compensating the transverse disturbance; and
   the amount of another variable correlating with one of the two variables.

7. The method according to claim 6, wherein
   said chassis intervention comprises at least one of,
      a braking intervention at at least one vehicle wheel;
      an influence of the wheel loads at at least one vehicle wheel;
         an influencing of the servo torque of a servo motor of a servo steering system; and
         a change of at least one wheel drive torque at at least one vehicle wheel; and
   when a magnitude of the intervention determination value is below a lower threshold value, only one of the wheels, especially one of the non-steerable wheels is braked via the respective associated braking device.

8. The method according to claim 6, wherein:
   said chassis intervention comprises at least one of:
      a braking intervention at at least one vehicle wheel;
      an influence of the wheel loads at at least one vehicle wheel;
         an influencing of the servo torque of a servo motor of a servo steering system; and
         a change of at least one wheel drive torque at at least one vehicle wheel;
   the intervention determination value is greater than or equal to the lower threshold value, and lower than an upper threshold value, only one of the steerable wheels is braked at the front axle via the respective associated braking device.

9. The method according to claim 6, wherein:
   said chassis intervention comprises at least one of:
      a braking intervention at at least one vehicle wheel;
      an influence of the wheel loads at at least one vehicle wheel;
         an influencing of the servo torque of a servo motor of a servo steering system; and
         a change of at least one wheel drive torque at at least one vehicle wheel;
   if the intervention determination value is greater than or equal to the upper threshold value, both wheels of the same vehicle side are braked via the respective associated braking device.

10. The method according to claim 6, wherein said chassis intervention comprises at least one of,
   a braking intervention at at least one vehicle wheel;
   an influence of the wheel loads at at least one vehicle wheel;
      an influencing of the servo torque of a servo motor of a servo steering system; and
      a change of at least one wheel drive torque at at least one vehicle wheel;
   both wheels of the same vehicle side are braked via associated braking devices; and
   braking force distribution between a steerable wheel and a corresponding non-steerable wheel of the same vehicle side is parameter-dependent, and is preset in dependence on the vehicle and/or can be adjusted according to the drive situation.

11. The method according to claim 1, wherein said chassis intervention comprises at least one of:
   a braking intervention at at least one vehicle wheel;
   an influence of the wheel loads at at least one vehicle wheel;
   an influencing of the servo torque of a servo motor of a servo steering system; and
   a change of at least one wheel drive torque at at least one vehicle wheel.

12. The method according to claim 1, wherein a chassis intervention which is triggered after fulfillment of the intervention condition is ended, if at least one of the following is true:
   a braking torque variable describing the the braking torque caused by the driver is higher than a braking torque threshold value;
   the magnitude of a vehicle steering angle is greater than a steering angle threshold value; and
   the magnitude of steering angle speed is greater than a steering angle speed threshold value.

13. The method according to claim 1, wherein the transverse dynamics disturbance value is filtered by a high pass filter prior to checking the intervention condition.

14. Apparatus for influencing transverse dynamics of a vehicle, said apparatus comprising:
- a disturbance variable determination device for determining the transverse dynamics disturbance variable acting on the vehicle;
- a checking device which determines whether a preset intervention condition is fulfilled; and
- a device which implements a chassis intervention to influence the transverse dynamics when the intervention condition is fulfilled;
- wherein, the intervention condition is determined to be fulfilled when a magnitude of the determined transverse dynamics disturbance variable is higher than a disturbance variable threshold value, and when at least two of the following criteria are fulfilled
    - longitudinal speed of the vehicle is higher than a longitudinal speed threshold value of the vehicle;
    - a sensor detected actual yaw rate is lower than a calculated current yaw rate; and
    - a slip difference variable describing the slip difference between two vehicle wheels is lower than a slip differential threshold value.

* * * * *